UNITED STATES PATENT OFFICE.

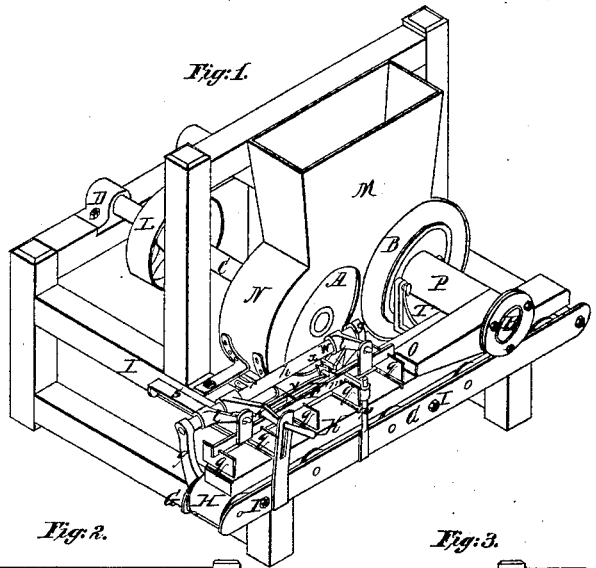
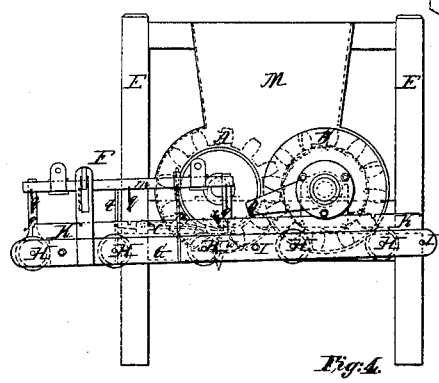
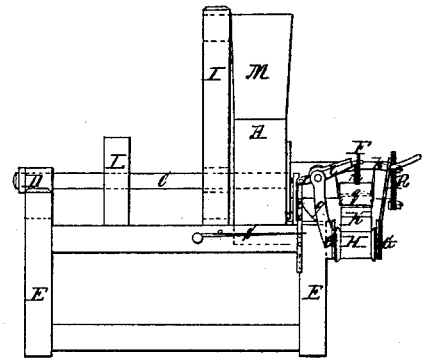
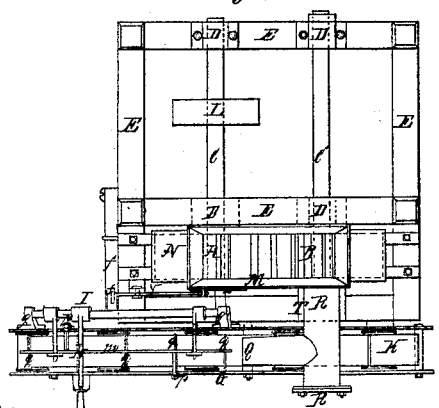
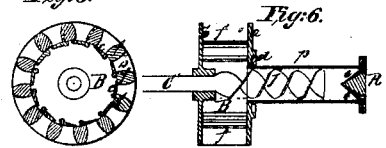

HENRY LEGUAY, OF ST. LOUIS, MISSOURI.

MACHINE FOR WORKING CLAY.

Specification of Letters Patent No. 21,506, dated September 14, 1858.

*To all whom it may concern:*

Be it known that I, HENRY LEGUAY, of the city and county of St. Louis and State of Missouri, have invented a new and useful Machine for Working Clay and other Plastic Substances to Make Brick, Tubes, Architectural Moldings, and other Articles; and I do hereby declare that the same is described and represented in the following specifications and drawings.

To enable others skilled in the art to make and use my invention I will proceed to describe its construction and operation, referring to the drawings, in which the same letters indicate like parts in each of the figures.

Figure 1, is a perspective view of the machine. Fig. 2, is a front elevation. Fig. 3, is a side elevation. Fig. 4, is a plan or top view.

The nature of my invention and improvements in machines for working clay, and other plastic substances, consists in making openings and valves in the spaces between the teeth of one or both of the grinding or crushing gears, so that the teeth of one wheel will force the clay or substance ground through said openings into the hollow space in the interior of the other wheel with sufficient pressure to force the substance ground out through the molding or forming apparatus, applied to the side of the wheel, either with or without the aid of a screw or carrier in the molding tube; also in a cutting apparatus arranged and applied so that it may be operated automatically, by the machine, or by hand, to separate the substance molded into parts, as desired to make brick or other articles.

In the accompanying drawings E, E, is a strong frame composed of posts, girders and bars firmly fastened together to support the stationary and working parts of the machine which are applied to said frame.

C, C', are shafts turning in boxes D, D, fastened to the bars E, E, and carrying the spur gears A, and B, which grind and mix the clay or other substance worked. The shaft C, has the pulley L fastened to it for a belt from the moving power which is to operate the machine.

A, is a common spur gear, with teeth of a proper form as shown in the drawing.

B is a hollow gear consisting of two disks $a$, and $b$, connected by the teeth $f$, $f$, as shown in the section Fig. 6. The bottom of the spaces between the teeth are made open, so that the teeth of the gear A, will force the clay or substance ground through the open spaces between the teeth $f$, $f$, into the center of the wheel B. These openings between the teeth $f$, $f$, through which the clay is forced are provided with valves $c$, $c$, Fig. 5, hinged on pins passing through the disks $a$, and $b$, and arranged to open in, toward the center of the wheel, so as to allow the substance ground to be forced in by the teeth of the wheel A, and then close so as to prevent the substance so forced in from coming out by said valves and compel it to pass out through the opening in the center of the disk, $a$, into and through the pipe P, and out of said pipe around the core R, so as to form a hollow tube or cylinder of the material ground by means of the pressure of the gears upon the substances ground while grinding it.

The core R, which forms the interior of the pipe is supported by two or more thin plates $e$, $e$, which do not extend back to the opening around the core so that the clay is closed beyond the plates $e$, $e$, by the pressure of the mold around the rear end of the core, so as to form a perfect pipe or tube. The core R, may be removed and a mold substituted that will form the clay into such other shape as may be desired; or the end of the pipe P may be closed and the clay forced out through the square pipe Q, from the side of the pipe P, onto the board K, in a proper shape to form brick, when separated into pieces of a proper length by the cutters $q$, $q$, the board K, being arranged to traverse on the rollers H, H, under it, as the clay issues from the pipe Q, onto it, as the machine is operated. The pipe P, is fitted to the opening in the disk $a$ at $d$, and supported in its proper position by the brace T, fastened to the frame E. In order to carry and force the clay along in the tube P, I make a spiral conveyer $j$, by twisting a piece of plate metal into the form of the body of a common screw auger, as shown in Fig. 6, and fastening it to the end of the shaft C', so that it will be turned by it and force the clay forward in the tube P. The pivots of the rollers H, H, turn in the bars G, G, connected together by the studs I, and fastened to the frame E. The stands $g$, $g$, are fastened to the bar G, and support the shaft $h$, which carries the levers $l$, $l$, to traverse the bar $m$ and cutters $q$, $q$, to separate the clay after it is molded into pieces and form brick, etc. The bar *m*, is provided with two arms which traverse on the rods *p, p*, to guide the bar and cutters when they are operated.

*k*, is a lever fastened to the shaft *h*, to turn the bar and work the cutters by hand. To work the cutters automatically the shaft *h*, has the arm *r*, fastened to it, which is connected by the link *t*, to the lever *v*, which vibrates in a stand fastened to the frame E, which lever *v*, is depressed by a pin in the wheel *w*, which turns on a stud in the frame E, and is moved by one or more pins in the wheel A, so as to depress the lever *v*, and operate the cutters *q*, and push them down to separate the clay forced out of the tube Q. These cutters are raised by the spring S, fastened to the frame E, and connected to the link L.

M, is a hopper into which the clay is put to supply the grinding gears A, and B. When the gear A, is solid between the teeth the faces of the teeth on the gear B, should be made narrow, as shown by dotted lines in Figs. 2 and 5, so that there will be room for the clay between the teeth of the gear A, to slip out by the narrow or thin teeth on the gear B. I contemplate that the gear A may be made hollow and provided with valves like B, and I think it may be best to make valves to the alternate spaces between the teeth in each wheel and the other spaces solid and to make the teeth thin that work against the solid spaces, so that the clay will have a chance to escape by the side of the teeth, and when both gears are made hollow and provided with valves there may be two tubes like P, with molds; or there may be a tube or pipe with two branches, so as to receive the clay from both wheels and deliver it through one mold.

The machine may be operated by a belt applied to the pulley L, and the clay properly moistened put into hopper M, when the gears crush and grind it, and the teeth of the gear A, force the clay through the valve openings in the spaces between the teeth of the gear B, and compel it to pass out through the pipe P, and through the molds applied to the pipe, as heretofore described. The boards K, K, descend with a slight inclination on the rollers H, H, so as to move freely with the clay as it issues from the mold Q, and a concave trough may be arranged on rollers to receive the clay from the mold R.

I believe I have described my invention for working clay and other plastic substances so as to enable any person skilled in the art to make and use it. I will now state what I desire to secure by Letters Patent, to wit:

What I claim as my invention in mills or grinding gears for grinding clay or other substances, is—

1. Making openings and valves substantially as described, in the spaces between the teeth, in one or both gears to receive and hold the clay or substance ground, substantially as described.

2. I also claim in combination with the grinding gears the molding tube when these parts are constructed and arranged for joint operation substantially as described.

HENRY LEGUAY.

Witnesses:
C. B. POWELL,
T. G. GOESEL.